United States Patent
Kammerer et al.

(10) Patent No.: US 10,132,032 B2
(45) Date of Patent: Nov. 20, 2018

(54) IMITATION LEATHER AND METHOD FOR PRODUCING SAME

(71) Applicants: Birgit Kammerer, Kupferzell (DE); Sonja Kaspar, Krautheim-Neunstetten (DE); Gabriele Beate Wittmann, Öhringen (DE)

(72) Inventors: Birgit Kammerer, Kupferzell (DE); Sonja Kaspar, Krautheim-Neunstetten (DE); Gabriele Beate Wittmann, Öhringen (DE)

(73) Assignee: KONRAD HORNSCHUCH AG, Weissbach (DE)

( * ) Notice: Subject to any disclaimer, the term of this patent is extended or adjusted under 35 U.S.C. 154(b) by 231 days.

(21) Appl. No.: 13/866,823

(22) Filed: Apr. 19, 2013

(65) Prior Publication Data

US 2013/0316141 A1 Nov. 28, 2013

(30) Foreign Application Priority Data

Apr. 20, 2012 (EP) ..................................... 12164957

(51) Int. Cl.
*D06N 3/00* (2006.01)
*B32B 5/02* (2006.01)
(Continued)

(52) U.S. Cl.
CPC ............. *D06N 3/0095* (2013.01); *B32B 5/02* (2013.01); *B32B 27/065* (2013.01); *B32B 27/12* (2013.01);
(Continued)

(58) Field of Classification Search
CPC ...... B32B 338/06; B32B 338/10; B32B 27/12; B32B 38/06; B32B 2605/00; B32B 2605/003; B32B 2605/08; D06N 3/0095; D06N 3/00; D06N 3/0006; D06N 3/0009; D06N 3/0013; D06N 3/06; D06N 2211/28;
(Continued)

(56) References Cited

U.S. PATENT DOCUMENTS 3,537,947 A * 11/1970 Brazdzionis .......... B29C 67/202
156/178
4,017,656 A * 4/1977 Lasman et al. ................. 428/86
(Continued)

FOREIGN PATENT DOCUMENTS

DE 1 933 255 A1 1/1971
DE 102 57 399 A1 7/2004
(Continued)

*Primary Examiner* — Carson Gross
(74) *Attorney, Agent, or Firm* — Pauley Erickson & Kotis

(57) ABSTRACT

An imitation leather including a three-dimensional textile supporting material and a PVC-based covering that is applied to one side of the supporting material and includes three successively applied layers. The first layer of which is applied directly to the supporting material without an adhesion-promoting glue layer, the second layer of which is embodied as an intermediate layer and applied directly to the first layer and the third layer of which serves as a top layer and is applied directly to the second layer. This invention also discloses a method for producing such an imitation leather and an interior component of a motor vehicle having a visible surface that is composed of such an imitation leather.

20 Claims, 1 Drawing Sheet

(51) Int. Cl.
    *B32B 27/06*     (2006.01)
    *B32B 27/12*     (2006.01)
    *B32B 27/30*     (2006.01)
    *D06N 3/06*     (2006.01)
    *B32B 38/10*     (2006.01)
    *B60R 13/02*     (2006.01)
    *B60N 2/58*     (2006.01)
    *B32B 38/06*     (2006.01)

(52) U.S. Cl.
    CPC ............ B32B 27/304 (2013.01); B32B 38/10 (2013.01); D06N 3/0002 (2013.01); D06N 3/0097 (2013.01); D06N 3/06 (2013.01); *B32B 38/06* (2013.01); *B32B 2266/0235* (2013.01); *B32B 2305/022* (2013.01); *B32B 2305/18* (2013.01); *B32B 2327/06* (2013.01); *B32B 2605/003* (2013.01); *B32B 2605/08* (2013.01); *B60N 2/5891* (2013.01); *B60R 13/02* (2013.01); *D06N 2211/261* (2013.01); *D06N 2211/263* (2013.01); *D06N 2211/28* (2013.01); *D06N 2213/03* (2013.01); *Y10T 156/1041* (2015.01); *Y10T 428/24438* (2015.01); *Y10T 428/24942* (2015.01); *Y10T 428/24967* (2015.01); *Y10T 428/249921* (2015.04); *Y10T 442/3195* (2015.04); *Y10T 442/45* (2015.04); *Y10T 442/54* (2015.04); *Y10T 442/56* (2015.04); *Y10T 442/59* (2015.04)

(58) Field of Classification Search
    CPC .. D06N 3/0077; B60R 13/02; B60R 13/0237; B60R 13/0243; B60R 13/025; B60R 13/0256; B60R 13/0262; B60N 2/58; B60N 2/5891; Y10S 428/904
    USPC .......................................... 156/220, 247, 61
    See application file for complete search history.

(56) References Cited

U.S. PATENT DOCUMENTS

| | | | |
|---|---|---|---|
| 6,231,940 B1* | 5/2001 | Aichner | B32B 9/00 428/332 |
| 8,240,180 B2 | 8/2012 | Hanson et al. | |
| 2009/0311480 A1* | 12/2009 | Fischer et al. | 428/160 |
| 2009/0324833 A1* | 12/2009 | Chou | B32B 27/12 427/278 |
| 2012/0055202 A1* | 3/2012 | Mueller | D04B 21/16 66/195 |
| 2012/0258303 A1* | 10/2012 | Buhring | B32B 5/18 428/318.6 |

FOREIGN PATENT DOCUMENTS

| | | |
|---|---|---|
| DE | 20 2011 004 902 U1 | 3/2012 |
| EP | 2 357 080 A1 | 8/2011 |
| WO | WO 01/14138 A1 | 3/2001 |
| WO | WO 02/04740 A2 | 1/2002 |
| WO | WO 2011/091878 A1 | 8/2011 |

* cited by examiner

IMITATION LEATHER AND METHOD FOR PRODUCING SAME

BACKGROUND OF THE INVENTION

Field of the Invention

This invention relates to an imitation leather, including a three-dimensional textile supporting material and a covering applied to one side of the supporting material.

This invention also relates to a method for producing an imitation leather as well as an interior component of a motor vehicle, which has a visible surface of such an imitation leather.

Discussion of Related Art

Imitation leathers of the kind mentioned above are known and used, for example, as decorative coverings for interior components of motor vehicles that are directly and/or indirectly exposed to solar radiation. The three-dimensional textile supporting material lends the imitation leather its desired strength while the covering forms the visible side, which lends the imitation leather its surface properties and imitates a natural leather surface by also having, for example, an embossed surface resembling the grain of leather.

Particularly for producing high-quality surfaces for internal components of a motor vehicle, it is desirable to be able to adapt the imitation leather as perfectly as possible to the three-dimensional shape of the internal component. Also, the surface of the imitation leather should also be soft, such as elastically flexible in order to produce a high-quality appearance.

To achieve this goal, German Patent Reference DE 102 57 399 B4 discloses embodying a decorative covering for an interior component of a motor vehicle of a crocheted spacer fabric as the supporting material with a surface layer, which is applied to it and is preferably of polyurethane. In this known decorative covering, however, the crocheted spacer fabric used has protruding threads, fringes, or loops in the region of its outsides forming the surfaces, which serve as hooking elements for the surface layer, and also the surface layer is bonded to the crocheted spacer fabric by an interposed glue layer. This is labor-intensive and increases the cost of the production process for such a decorative layer, a factor that needs improvement.

SUMMARY OF THE INVENTION

One object of this invention is to provide an imitation leather and a method for producing the same, which feature particularly efficient production and are particularly suitable for use in leather-lining applications for automotive interiors.

The object is attained according to the invention by embodying an imitation leather in accordance with features of this specification and the claims.

A method for producing an imitation leather according to this invention is also taught by this specification and the claims.

Advantageous embodiments and modifications of the invention are also taught by this specification and the claims.

The imitation leather according to this invention includes a three-dimensional textile supporting material and a polyvinyl chloride (PVC)-based covering that is applied to one side of the supporting material and is of or composed of three successively applied layers, the first layer of which is applied directly to the supporting material without an adhesion-promoting glue layer, the second layer of which is embodied as an intermediate layer and applied directly to the first layer, and the third layer of which serves as a top layer and is applied directly to the second layer.

As this invention was developed, it was determined that such an embodiment of the covering with a total of three successively applied layers of PVC or a PVC compound onto a three-dimensional textile supporting material can be used to produce an imitation leather that does not need glue layers between the covering and the textile supporting material, thus eliminating the additional expense of applying glue to the supporting material before attaching the covering. With the absence of a glue layer, the supporting material is also not subjected to negative influences on its mechanical properties by the penetration of glue into the supporting material so that the imitation leather according to this invention features the best handling properties and a particularly high-quality appearance. The absence of a glue layer in the imitation leather according to this invention also prevents undesirable gas emissions and the accompanying negative effects on odor.

According to one proposed embodiment of this invention, the textile supporting material is of or composed of a crocheted spacer fabric, a spacer knit, or a spacer woven, with first and second fabric surfaces that are spaced apart from each other by strands of pile yarn. The fabric surfaces, on their outsides oriented away from the pile yarn, can be embodied as smooth-surfaced, without protruding strands and the first layer of the covering is applied directly to the outside of the second fabric surface. As this invention developed, it surprisingly turned out that not only is it possible to eliminate an adhesion-promoting glue layer between the supporting material and the covering, but the adhesion produced between the covering and the supporting material is also so powerful that the crocheted spacer fabric requires no additional hooking aids such as protruding threads, fringes, or loops so that the selection of suitable crocheted spacer fabric is not limited by this aspect.

In the context of this invention, a crocheted spacer fabric is understood to be a three-dimensional textile fabric with two crocheted fabric surfaces that are connected to and spaced apart from each other by strands of pile yarn whereas in a spacer knit, two knit fabric surfaces are connected to and spaced apart from each other by strands of pile yarn. In a spacer woven, two woven top layers serving as fabric surfaces are kept spaced a defined distance apart by perpendicular strands of filler or pile yarn, with the three-dimensional structure being produced during the weaving process.

The crocheted spacer fabric advantageously has a compression hardness of 5 to 45 kPa as defined by DIN EN ISO 3386-1.

Alternatively, the imitation leather according to this invention can also have a smoothed needle felt or a spacer fleece used as the three-dimensional textile supporting material, which is produced for example by carding of the fleece fibers and thermal and mechanical bonding or by bonding the pile by a stitch-bonding technique or mesh formation.

The textile supporting material used in this invention advantageously has a weight per unit area of 100 to 1000 g per square meter and a thickness of 1.0 to 8 mm.

The textile supporting material can be produced based on polyester, polyamide, cotton, viscose, wool, and/or blends thereof. Its top and bottom surfaces can be of or composed of the same or different materials.

The first layer of the covering can have a weight per unit area of 50 to 200 g per square meter. The second layer of the covering can have a thickness of 0.15 to 2.0 mm, and the third layer can have a thickness of 0.1 to 1.2 mm.

If necessary, the imitation leather according to this invention can be embossed on the surface, for example with a leather grain, at least in the region of the third layer of the covering.

Naturally, the properties of the covering can be influenced through the use of various additives. For example, one or more layers of the covering can be treated with a flame retardant such as antimony trioxide, while in particular, the third layer that constitutes the subsequent visible surface can be adjusted as needed in terms of color and luster through the addition of pigments.

The method according to this invention for producing an imitation leather with a three-dimensional textile supporting material and a covering which is applied to one side of the supporting material, is based on PVC or a PVC compound, and has three successive layers and includes the following steps:

1. Application of the third layer of the covering, which forms or constitutes the subsequent top layer, in paste form onto a removable backing and subsequent drying of the third layer;
2. Application of the second layer of the covering as an intermediate layer onto the dried third layer and subsequent drying of the second layer;
3. Application of the first layer of the covering in paste form onto the dried second layer;
4. Placement of the textile supporting material onto the first layer, which is in paste form, and subsequent drying of the first layer; and
5. Detachment of the third layer from the backing.

The use of this intrinsically known reverse method, in which the subsequent top surface of the imitation leather is applied to a removable backing as a first layer and the other layers are then applied to it, produces an imitation leather with a covering permanently bonded to the supporting material without particular preparation of the textile supporting material and without the aid of additional adhesives.

The drying of the first, second, or third layer preferably occurs at a temperature of 140 to 240° C. in a corresponding drying oven.

A continuous production of the imitation leather is sought so that the detachable backing is composed, for example, of an endlessly circulating siliconized paper belt or release-paper belt onto which the third layer that subsequently forms or constitutes the top layer is applied in paste form and subsequently dried, then the second layer is applied to it as an intermediate layer and dried, then the first layer of the covering is applied in paste form to the dried second layer, and then the textile supporting material is placed onto the first layer which is still in paste form before this first layer is likewise dried. Thereafter, the detachable backing is separated from the third layer lying against it and the resultingly structured imitation leather is removed and used, with the supporting material constituting the underside.

In order to lend the imitation leather produced with the method according to this invention the desired appearance, compression elasticity, flexibility, and rebound characteristics, according to one proposed embodiment of this invention, a crocheted spacer fabric, spacer knit, or spacer woven, which has first and second fabric surfaces that are connected to each other by strands of pile yarn and has smooth-surfaced outsides without protruding threads, or a needle felt or spacer fleece can be used as the textile supporting material.

At least the third layer of the covering, after being detached from the backing, can also be embossed by the vacuum-embossing method at a temperature from 130° C. to 250° C., preferably 175° C. to 210° C., and in particular at 185° C.

Through the use of the vacuum-embossing method according to this invention, it is possible for the covering of the previously produced imitation leather, such as the composite of a supporting material and covering, to be subsequently provided with an individual grain. Conventional steel embossing methods cannot be used for such a subsequent embossing without loss of thickness because the inevitable effects of temperature and pressure have an extremely negative impact on the thickness and special properties of the imitation leather such as flexibility and rebound characteristics, particularly when a crocheted spacer fabric is used as the textile supporting material.

In addition, with pre-embossing of the release paper used as the backing or casting processes in embossed silicones, the leather grain produced for example by embossing can no longer be formed or varied afterward.

One advantage of the vacuum-embossing method used according to this invention, however, is the absence of pressure exertion and the absence of any negative temperature influence on the supporting material, in particular a crocheted spacer fabric, so that shrinkage in the crocheted spacer fabric is largely prevented and the properties of the three-dimensional supporting material are retained.

The second layer used as the intermediate layer of the covering according to this invention can, depending on the application, be embodied in a compact, such as unfoamed, form or in a foamed form. In the case of a foamed embodiment, the foaming occurs after it has been applied to the third layer.

BRIEF DESCRIPTION OF THE DRAWINGS

This invention is explained in greater detail below in view of exemplary embodiments shown in the drawings, wherein.

DETAILED DESCRIPTION OF INVENTION

Figure 1:
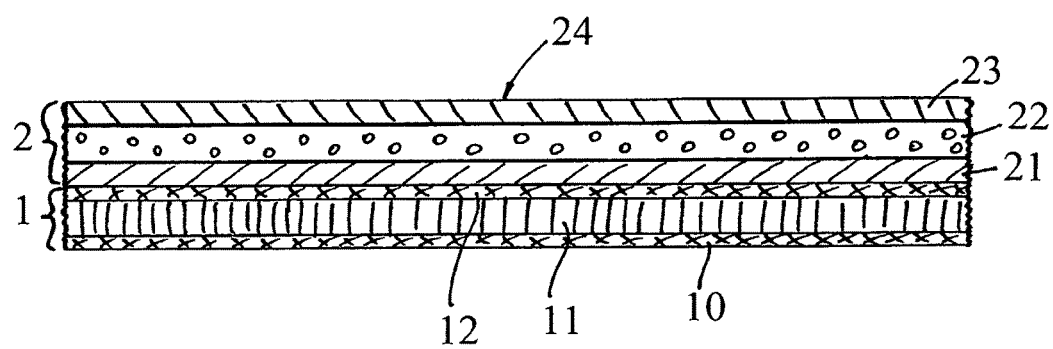
FIG. 1 is a schematic depiction of a section through a first exemplary embodiment of the imitation leather according to this invention.

FIG. 1 shows a composite of a three-dimensional textile supporting material 1 and a covering 2, which comprises or is of or composed of three layers 21, 22, 23 and applied to one side of the textile supporting material 1, that is used as an imitation leather, such as for applications in motor vehicle interiors.

The three-dimensional textile supporting material 1 in the exemplary embodiment shown in FIG. 1 comprises or is of or composed of a polyester fiber-based crocheted spacer fabric, which has two chain-crocheted fabric surfaces 10, 12 that simultaneously constitute or form the outsides or surfaces of the crocheted spacer fabric. The fabric surfaces 10, 12 are spaced apart from each other and are kept at this distance in an intrinsically known fashion by strands of pile yarn 11 extending perpendicularly between the two fabric surfaces 10, 12. A crocheted spacer fabric of this kind features particularly high compression elasticity, flexibility, and good rebound characteristics in response to mechanical stresses.

Because of the weaving process used, the faces of the two fabric surfaces 10, 12 can be provided with regular openings in the direction of the strands of pile yarn 11, for example they are porous, but on the whole, form a smooth surface without protruding threads, fibers, fringes, or loops.

The first layer 21 of a three-layer covering 2 is applied to the outside of the fabric surface 12 oriented away from the strands of pile yarn 11. All of the layers 21, 22, 23, of the covering 2 are PVC-based.

One essential feature of the imitation leather shown is the fact that the first layer 21 is applied directly to the fabric surface 12 of the crocheted spacer fabric without the interposition of a glue layer and is bonded to the crocheted spacer fabric in a powerfully adhering fashion.

Then a foamed second layer 22, which also makes the covering 2 elastically flexible, is applied to the first layer 21 and then a third layer 23 is also applied to this second layer 22, which third layer forms the top layer of the imitation leather and, like the first layer 21, comprises or is of or composed of a compact, for example unfoamed, PVC compound. All of these layers in the sequence shown adhere to one another without the interposition of adhesion-promoting glue layers.

The visible side of the imitation leather labeled with the reference numeral 24 can also have a surface embossing such as a leather grain. The surface embossing is preferably also provided by the vacuum-embossing method.

Figure 2:
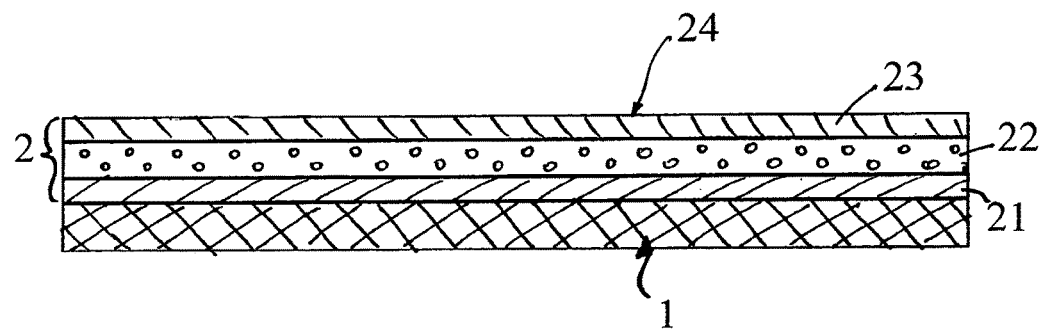
FIG. 2 is a schematic depiction of a section through a second exemplary embodiment of the imitation leather according to this invention.

With regard to the design and embodiment of the covering 2, the exemplary embodiment according to FIG. 2 has the same design and structure as in one exemplary embodiment, but in this exemplary embodiment, the three-dimensional supporting material 1 comprises or is of or composed not of a crocheted spacer fabric, but of a needle felt made of polyester fibers, which has smoothed surfaces. In this exemplary embodiment as well, the first layer 21 of the covering 2 adheres directly to the smooth surface of the supporting material 1 without the interposition of a glue layer.

EXAMPLES

Possible embodiments of an imitation leather according to this invention are explained below in view of exemplary embodiments, but this invention is not limited to these special embodiments.

Example 1

As a three-dimensional textile supporting material, a crocheted spacer fabric comprising or of or composed of polyester fibers and having a weight per unit area of 550 g per square meter was used, which had a thickness of 3.8 mm, a compression hardness of 22 kPa, a maximum tensile strength of 1000 N in the longitudinal direction and of 270 N in the lateral direction, and a continuing tear strength of 15 N in the longitudinal direction and of 25 N in the lateral direction.

Using the reverse method, first the third layer, then the second layer, and then the first layer of the top layer were built up in sequence on a detachable backing starting with the third layer, before this supporting material was then bonded to the first layer of the covering without the aid of an adhesion-promoting glue layer.

The first layer was comprising or of or composed of a PVC suitable for paste processing, with a K value of 70 to 80 with the addition of conventional softeners (trimellitates, phthalates, adipates, sebicates) and stabilizers (metal soaps) was spread onto a release paper and then dried at 140 to 240° C.

The third layer produced first was comprising or of or composed of a PVC suitable for paste processing, with a K value of 70 to 80 with the addition of conventional softeners (trimellitates, phthalates, adipates, sebicates), stabilizers (metal soaps), and pigments was spread onto a release paper and then dried at 140 to 240° C.

Onto the thus-produced third layer of the covering, the second layer was spread, which was likewise produced from a PVC with a K value of 70 to 80, and was made foamable through the addition of a suitable foaming agent. In addition, this second layer also contained flame retardant (antimony trioxide, aluminum hydroxide, and others) as well as pigments for coloring. The foamed second layer applied to the third layer was then dried together with the third layer in an additional drying step at 140 to 240° C.

Finally, the first layer comprising or of or composed of a PVC suitable for paste processing, with a K value of 70 to 80 with the addition of conventional softeners (trimellitates, phthalates, adipates, sebicates) and stabilizers (metal soaps) was spread onto the dried second layer and before this first layer was dried, the supporting material was placed onto it and then the entire composite was once again exposed to heat at 140 to 240° C. in order to also dry the first layer, which produced the permanent bond with the supporting material without requiring adhesive-promoting measures.

Example 2

As a supporting material, a crocheted supporting fabric comprising or of or composed of polyester fibers and having a weight per unit area of 360 g per square meter, a thickness of 2.3 mm, and a compression hardness of 15.0 kPa was provided with a covering according to the first example and then the covering was embossed with a leather grain in the region of its third layer.

Example 3

As a supporting material, a crocheted supporting fabric comprising or of or composed of polyester fibers and having a weight per unit area of 285 g per square meter, a thickness of 3.8 mm, and a compression hardness of 14.0 kPa was used, and the structure of the top layer bonded to it corresponded to that of Example 1.

Example 4

The same covering as in Example 1 was bonded to a smoothed polyester needle felt having a weight per unit area of 500 g per square meter and a thickness of 5 mm without the aid of additional glue layers and was processed into an imitation leather with a leather grain produced in the region of the third layer of the covering by the vacuum-embossing method.

The imitation leathers obtained in this way had excellent haptic qualities, compression elasticity, flexibility, and rebound properties, had particularly pronounced low-temperature resistance and long-term resistance to temperatures greater than 120° C., were resistant to the firing of airbags, resistant to hot light aging, and had very low emissions values, making them particularly promising for applications in motor vehicle interiors.

In particular, it is possible for interior components of a motor vehicle such as instrument panels, door panels, consoles, and seat areas to be provided with visible surfaces composed of such imitation leathers according to this invention.

European Patent Application No. 12164957.8, filed 20 Apr. 2012, the priority document corresponding to this invention, to which a foreign priority benefit is claimed under Title 35, United States Code, Section 119, and its entire teachings are incorporated, by reference, into this specification.

What is claimed is:

1. A method for producing an imitation leather, having a three-dimensional textile supporting material (1) and a covering (2) applied to one side of the supporting material (1), in which the covering (2) is polyvinyl chloride-based and has three successive layers (21), (22), (23) each comprising polyvinyl chloride, and including the steps of:
applying the third layer (23) of the covering (2), which forms a subsequent top layer, in a paste form onto a removable backing and subsequent drying of the third layer (23);
applying the second layer (22) of the covering (2) as an intermediate layer onto the dried third layer (23) and subsequent drying of the second layer (22);
applying the first layer (21) of the covering (2) in the paste form onto the dried second layer (22);
placing a crocheted spacer fabric as the textile supporting material (1) directly onto the first layer (21) while the first layer (21) is in the paste form and without interposition of an adhesive layer between the crocheted spacer fabric and the first layer (21), and subsequent drying of the first layer (21), the crocheted spacer fabric including a first fabric layer (10) spaced apart from and connected to a second fabric layer (12) by strands of pile yarn (11), and each of the first fabric layer (10) and the second fabric layer (12) having smooth-surfaced outsides without protruding threads; and
detaching the third layer (23) from the backing.

2. The method according to claim 1, wherein the drying of the first, second, and/or third layer (21), (22), (23) is carried out at a temperature of 140° C. to 240° C.

3. The method according to claim 1, wherein the imitation leather provides a visible surface of an interior component of a motor vehicle.

4. The imitation leather according to claim 1, wherein the top layer, which is on an opposite side of the imitation leather from the first fabric layer (10), is a visible surface of the imitation leather in an interior component of a motor vehicle.

5. The method according to claim 1, wherein the strands of pile yarn (11) extend between first connections to the first fabric layer (10) and second connections to the second fabric layer (12), wherein the first connections and second connections do not have threads, fibers, fringes, and loops protruding beyond the smooth-surfaced outsides of both the first fabric layer (10) and the second fabric layer (12).

6. The method according to claim 1, further comprising embossing at least the third layer (23) of the covering (2), after being detached from the backing, by vacuum-embossing at a temperature from 130° C. to 250° C.

7. The method according to claim 1, wherein the removable backing comprises an endlessly circulating belt.

8. The method according to claim 1, wherein the first fabric layer (10) is an underside surface of the imitation leather opposite the top surface (24) of the third layer (23), wherein the top surface is a visible surface of the imitation leather.

9. The method according to claim 1, further comprising foaming the second layer (22) using a foaming agent in the second layer (22).

10. The method according to claim 9, wherein each of the first layer (21) and the third layer (23) is a non-foam paste that does not include a foaming agent.

11. The method according to claim 1, wherein the supporting material (1) has a compression hardness of 5 to 45 kPa as defined by DIN EN ISO 3386-1.

12. The method according to claim 1, wherein the textile supporting material (1) has a weight per unit area of 100 to 1000 g per square meter and a thickness of 1.0 to 8 mm.

13. The method according to claim 1, wherein the textile supporting material is produced based on polyester, polyamide, cotton, viscose, wool, and/or blends thereof.

14. The method according to claim 1, wherein the first layer (21) of the covering (2) has a weight per unit area of 50 to 200 g per square meter.

15. The method according to claim 1, wherein the second layer (22) of the covering (2) has a thickness of 0.15 to 2.0 mm.

16. The method according to claim 1, wherein the third layer (23) of the covering (2) has a thickness of 0.1 to 1.2 mm.

17. The method according to claim 1, further comprising embossing a surface of the third layer (23) that is opposite the second layer (22).

18. The method according to claim 1, wherein the first layer (21) is connected directly to a smooth outer surface of the second fabric layer (12) without the interposition of a glue layer.

19. The method according to claim 18, wherein the first fabric layer (10) is a chain-crocheted fabric with a smooth outer surface that is an underside surface of the imitation leather apposite the top surface (24) of the third layer (23).

20. The method according to claim 1, wherein each of the first fabric layer (10) and the second fabric layer (12) is a chain-crocheted fabric forming the smooth-surfaced outsides and including porous openings in a direction of the strands of pile yarn (11) and each of the smooth-surfaced outsides form one of opposing smooth outer face surfaces of the textile supporting material (1) without threads, fibers, fringes, and loops protruding therefrom.

* * * * *